US012688023B2

(12) United States Patent
Chattopadhyay

(10) Patent No.: US 12,688,023 B2
(45) Date of Patent: Jul. 21, 2026

(54) ADDING OPERATORS TO CODE BASED ON SOURCE DATA CHARACTERISTICS AND A TARGET RUNTIME CONFIGURATION

(71) Applicant: Oracle International Corporation, Redwood Shores, CA (US)

(72) Inventor: Krishanu Chattopadhyay, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 170 days.

(21) Appl. No.: 18/407,853

(22) Filed: Jan. 9, 2024

(65) Prior Publication Data

US 2025/0224940 A1 Jul. 10, 2025

(51) Int. Cl.
*G06F 8/41* (2018.01)
(52) U.S. Cl.
CPC .............. *G06F 8/447* (2013.01); *G06F 8/433* (2013.01); *G06F 8/443* (2013.01)
(58) Field of Classification Search
CPC .......... G06F 8/447; G06F 8/433; G06F 8/443
See application file for complete search history.

(56) References Cited

U.S. PATENT DOCUMENTS

2013/0332449 A1* 12/2013 Amos ................. G06F 16/9024
707/798
2016/0246543 A1* 8/2016 Williams ............ G06F 11/3636
2018/0373509 A1* 12/2018 Zhang ....................... G06F 8/37

FOREIGN PATENT DOCUMENTS

CN 112287396 A * 1/2021 ........... G06F 21/602

OTHER PUBLICATIONS

NPL_Data Processing Method And Device Based On Privacy Protection_Eng_CN 112287396 A (Year: 2021).*
CN-112287396-A [Original Patent Document with translation] (Year: 2021).*

* cited by examiner

*Primary Examiner* — Ziaul A Chowdhury
(74) *Attorney, Agent, or Firm* — Invoke

(57) ABSTRACT
Systems and methods for converting data flow to data processing code. One example system includes an electronic processor configured to receive a data flow for processing a set of source data on a target runtime, determine a characteristic associated with the set of source data, determine a target configuration of the target runtime, generate data processing code at least by adding an operator to the data flow at a point based at least on the characteristic associated with the set of source data and the target configuration of the target runtime, and output the data processing code to a compiler for generation of machine executable code.

30 Claims, 7 Drawing Sheets

700

Receive a Data Flow
702

Determine Characteristics of Source Data
703

Determine Target Runtime Configuration
704

Generate Data Processing Code for Data Flow based on Characteristics of Source Data and Target Runtime Configuration
706

Output Data Processing Code to Compiler
710

Generate Compiled Code from Data Processing Code
712

Execute Compiled Code within Target Runtime
714

700

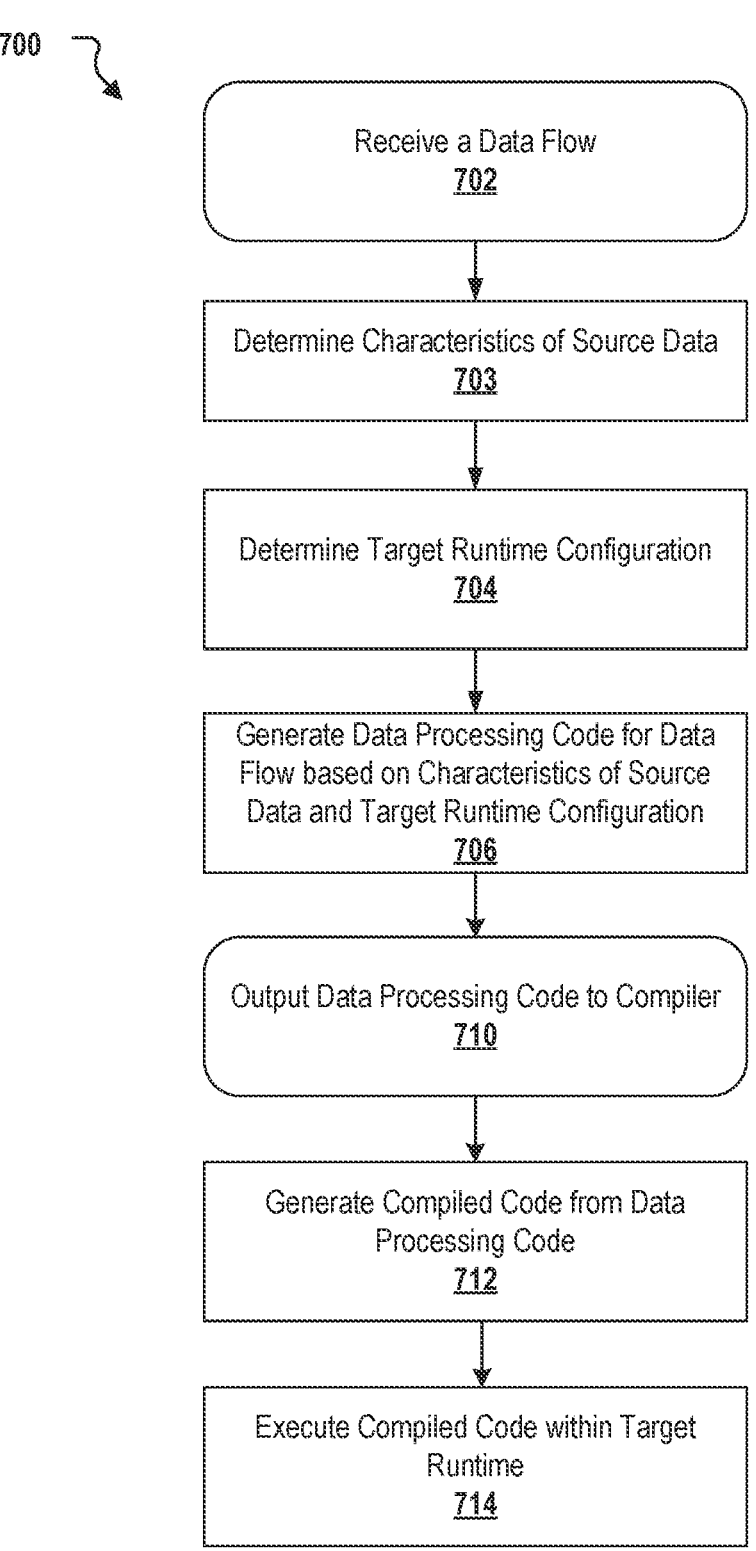

Receive a Data Flow
702

Determine Characteristics of Source Data
703

Determine Target Runtime Configuration
704

Generate Data Processing Code for Data
Flow based on Characteristics of Source
Data and Target Runtime Configuration
706

Output Data Processing Code to Compiler
710

Generate Compiled Code from Data
Processing Code
712

Execute Compiled Code within Target
Runtime
714

FIG. 7

ADDING OPERATORS TO CODE BASED ON SOURCE DATA CHARACTERISTICS AND A TARGET RUNTIME CONFIGURATION

TECHNICAL FIELD

Embodiments described herein are generally related to generating data processing code for purposes such as, for example, computer data analytics, data pipeline implementations (e.g., Extract, transform, and load (ETL), Extract, Load, and Transform (ELT) and the like), and business intelligence, and are particularly related to systems and methods for generating data processing code by adding one or more determining operators for a data flow based on data source attributes, target runtime attributes, or a combination thereof including, for example, based on one or more characteristics of source data and a target runtime configuration.

SUMMARY

Generally described, data analytics enables an examination or analysis of large amounts of data to derive conclusions or other information from that data while business intelligence tools provide an organization's business users with information describing their enterprise data in a format that enables those business users to make strategic business decisions. Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

Cloud-based computing environments and data warehouses can enable data integration to assist users with data movement and data loading tasks. For example, by employing various data integration tasks, such as a data flow, large volumes of data can be ingested from a variety of data assets; cleansed; transformed and reshaped; and efficiently loaded to target data assets. However, data processing runtime often lacks runtime optimization and therefore processing these data flows may require code level manual optimization to address different cardinalities that arise from the type of input data (e.g., that size or characteristics of the data) and the configuration of the target data processing cluster (e.g., the number of servers in the cluster, the shapes of the servers, and so forth). However, in some situations, a user may not have access to the configuration of the target data processing runtime and, thus, the user cannot manually perform appropriate optimizations. Moreover, in low or no code environments, the code is not exposed to the user and, therefore, manually optimizing the process flow at a code level is not possible.

Accordingly, in one aspect, disclosed herein are systems and methods for optimizing data integration tasks, such as a data flow, for increased efficiency and decreased runtime. For example, the described systems and methods evaluate an input data flow along with the data source environments and the target runtime environment and add operators to improve performance. For example, one method includes receiving a data flow for processing a set of source data on a target runtime; determining a characteristic associated with the set of source data; determining a target configuration of the target runtime; generating data processing code structured in a human readable format at least by adding an operator to the data flow at a point based at least on the characteristic associated with the set of source data and the target configuration of the target runtime; and outputting the data processing code to a compiler for generation of machine executable code.

It is appreciated that systems and methods in accordance with the present disclosure can include any combination of the aspects and features described herein. That is, systems and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIG. 7 is a flowchart illustrating a process for adding one or more operators to a data flow, according to at least some embodiments.

DETAILED DESCRIPTION

Figure 1:
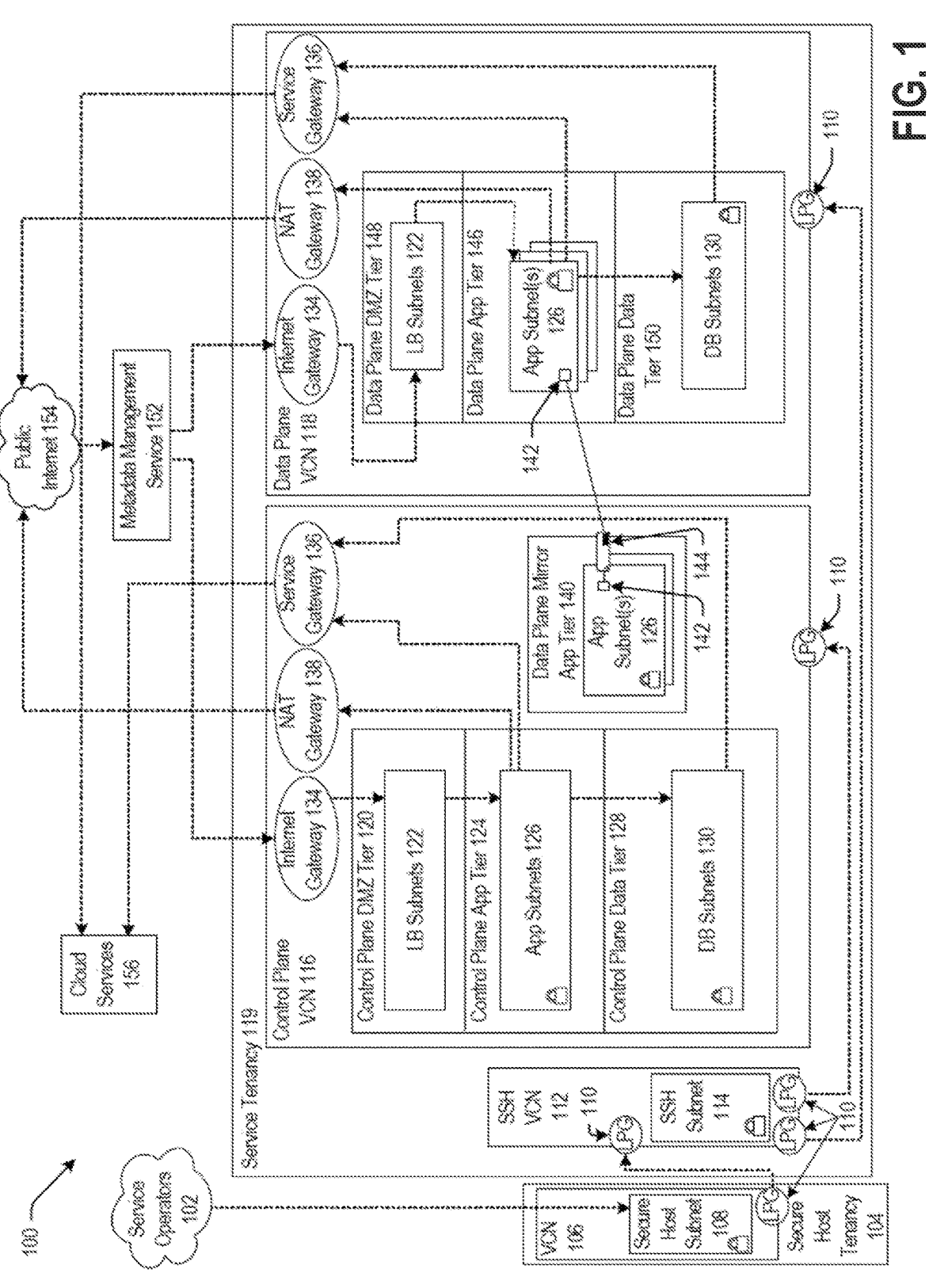
FIG. 1 is a block diagram illustrating one pattern for implementing a cloud infrastructure as a service system, according to at least one embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Definitions

Before disclosing the subject matter in greater detail, some context including terminology used herein is introduced.

As used herein, the term "data flow" includes a one or more data processing activities that may be performed sequentially, in parallel, or a combination thereof. Data flows may be represented as human-readable code, in a graphical or visual form (e.g., a directed acyclic graph, another human-readable format, or a combination thereof). A data flow may include operators that connect data processing activities.

In some applications, a "pipeline" or "data pipeline" may refer to data processing or a data flow or portion thereof wherein data from various data sources (e.g., a database or flat file) is moved to a data repository (e.g., without or without data processing), such as, for example, a data lake or data warehouse.

As used herein, the term "directed acyclic graph" (DAG) refers to a directed graph with, in some embodiments, no directed cycles. That is, a DAG may include vertices and edges with each edge directed from one vertex to another, such that following those directions will never form a closed loop.

As used herein, the term "staging operators" refers to operators that are introduced to optimize and increase the efficiency of resources needed to process a data flow while maintaining semantic equivalence in the data flow and, in particular, are operators that stage or hold data in a form that enables more efficient process of that data in downstream operators. Staging operators are introduced at specific points in the data flow and performed at runtime. Each starting operator and respective data flow point is determined according to the logic and contents of the data flow, attributes of the source data (e.g., characteristics of the source data, such as, for example, size, relationships between and amount of data sets), attributes of the target runtime environment, or a combination thereof.

As used herein, the term "human-readable format," "human-readable code," or "human-readable medium" generally includes any encoding of data or information that can be naturally read by humans, resulting in human-readable data. The information contained in a human-readable format is usually intended toward humans and not machines.

As used herein, the term "machine-readable format," "machine-readable code," or "machine-readable medium" generally includes data primarily designed for reading by electronic, mechanical devices, optical devices, or computers. The machine-readable format is designed for devices and machines. This format is complex for humans to understand. Specialized instruments are necessary to read the content of machine-readable data. Similarly, specialized devices are also necessary to generate machine-readable data. For the machine to read data, the information must follow the approved format understandable for the machines (e.g., compiled, machine-readable code).

Cloud-based Computing Platforms

Cloud-based computing platforms provide scalable and flexible computing resources for users. Infrastructure as a service (IaaS) is one particular type of cloud computing platform. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, data processing, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the cloud provider's services to perform various functions, including balancing network traffic, troubleshooting application issues, monitoring performance, managing disaster recovery, etc.

A cloud computing model may involve a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In some examples, IaaS provisioning may refer to acquiring computers or virtual hosts for use, installing needed libraries or services on them, or a combination thereof. In some embodiments, deployment does not include provisioning, and provisioning may need to be performed first before deployment.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described deployment techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Moreover, IaaS may offer entire suites of cloud solutions around a customer's data, for example solutions for authoring transformations, loading data, and presenting the data. For example, data integration is a fully managed, multitenant service that helps data engineers and developers with data movement and data loading tasks. A large volume of data can be ingested from a variety of data assets; cleansed; transformed and reshaped; and efficiently loaded to, for example, Oracle Cloud Infrastructure (OCI) target data assets. These target data assets represent data sources that can be used in data integration data flows, tasks, and pipelines, which may be compiled as applications and executed on an analytics or data processing engine, such as, for example, Apache Spark.

Data Flow Processing

Users of IaaS resources may create data flows for a data processing job executed by a data processing engine. These data processing jobs, however, may have performance issues. Accordingly, systems and computer-implemented methods described herein solve these issues and improve performance by optimizing a data flow. Optimization may include adding one or more operators (e.g., staging operators) to a data flow when converting a data flow to data processing code (e.g., human-readable code) for compiling. In some embodiments, the operators are specific to the input (source) data for the data flow and the data processing infrastructure (e.g., the target runtime configurations). While optimizing performance of the data flow, the added operators do not alter the semantics of the data flow. Accordingly, the generated data processing code includes one or more operators selected by the user (e.g., as specified in the data flow, such as, for example, as a DAG, source code, or other type of user input defining the data flow) and additional operators for optimizing the processing of the data flow.

In an example embodiment, a user inputs a data flow that may include or be defined as a DAG of data processing/transformation operators for processing a set of source data with a data processing engine (e.g., an Apache Spark data processing engine). The data flow is optimized as part of a two-stage compilation. In the first stage, the data flow is processed and converted to data processing code for the target runtime that is structured in a human-readable format, wherein the data processing code includes the addition of one or more operators (e.g., staging operators) to the data flow while maintaining the semantic equivalence. In some descriptions, the added operators may be referred to as "hidden" operators as they are added as part of the two-stage compilation (as compared to being directly or explicitly added by a user).

In some embodiments, the one or more operators are added according to one or more attributes of the source data, the target data processing runtime, or a combination thereof, which may include a characteristic associated with the set of source data, a target configuration of the target runtime, or a combination thereof. The one or more operators may be added based on rule-based optimization or a cost-based optimization. As one non-limiting example, a rule-based optimization may look for duplicate dataflow transformations and be specified as a rule with the following general structure: WHEN [particular data flow or portion thereof exists] and/or [based on one or more attributes of source data and/or the target data processing runtime configuration], THEN add operator(s) [X] [at a particular location in the data flow]. In some embodiments, such rules may define the "particular data flow or portion thereof" as a predetermined signature, which may define one or more operators and/or one or more sequences of operators within the data flow representing an opportunity for optimizing the data flow. For example, a predetermined signature may define a case for removing repetitive data flows, a case for targets having a smaller number of partitions, a case for removing duplicative data reads (e.g., associated with a sequence of read commands reading the same data for us with different downstream operators (e.g., different filters)), or the like. The predetermined signature may also define the location for adding the operator, such as, for example, after or as part of an initial data read with the predetermined signature.

As another non-limiting example, a cost-based optimization may include similar rules but may run a simulated or predicted processing cost associated with a current data flow and may only add one or more operators in response to the cost satisfying a particular amount or the cost savings associated with adding one or more operators satisfying a threshold. Here, cost refers to the cost of data processing where each operator may have a cost coefficient and the total cost for each of the optimization option may be used to choose an optimized dataflow DAG.

The attributes associated with the set of source data may represent various characteristics of the source data, such as, for example, a size of the source data, one or more locations of the source data, a type of the source data, the number of rows of a database table, a size of the intersection for each unique key, or a combination thereof. The target configuration of the target runtime may define a processing environment for the data flow, such as, for example, a number of servers, size (e.g., number of CPUs or VMs) in a cluster, a shape of the servers, CPUs, VMs, or the like, a number of clusters, bandwidth limitations, performance characteristics of the storage, or a combination thereof. In some embodiments, a user may input one or more attributes associated with the source data, the target configuration of the target runtime, or a combination thereof as part of defining the data flow. In other embodiments, the characteristics, the configuration, or both may be determined as part of the optimization stage of the two-stage compilation based on the data flow, based on the computing environment, infrastructure, and/or data associated with the user and/or the data, or a combination thereof. For examples, data sources may provide raw statistics and target data processing clusters may provide cluster statistics, which can be used to determine the characteristics and configuration used during the optimization stage. In other words, during a first stage of compiling the compiler (also referred to as a "optimizer" here) may have access to statistics associated with the data sources, the target runtime, or a combination thereof, which the optimizer uses to perform data flow optimizations as described herein.

Generally, the data processing code generated as part of the first stage of the compilation process, even with the addition of the operators, provides semantic equivalence to the data flow as defined (e.g., by the user) but is optimized, in terms of processing resources, based on the target data processing runtime. In some embodiments, each added operator improves performance by reducing a cost or footprint associated with executing the data flow in the target runtime. At the second stage, the data processing code is provided to a compiler that generates code for the target runtime (e.g., generates machine-readable code).

As one non-limiting example, the data processing code (as generated during the first stage of the compilation) transforms repetitive data or operations represented within the provided data flow such that operations (e.g., data reads or loads) are executed once, and the output is persisted as staged output instead of using the original source and transformations in the data flow as provided. For example, in some cases, a staging operator is inserted at a particular point in the data flow to persist content. The staging operator may be configured to persist content to external storage (e.g., a cloud object store or a runtime managed store such as a persistent cache).

For example, a user generated data flow may include repetitive data processing that performs the same upstream operations. These operations, for example, could involve repetitively reading data from a data source or applying transformations (e.g., a filter) and are therefore expensive. As an example, a data flow may include operations such as:

SRC1→TX1→TX2→TX3
SRC1→TX1→TX2→TX4
SRC1→TX1→TX2→TX5

As part of the optimization in the first stage of compilation, the output of SRC1→TX1→TX2 can be persisted by introducing a staging operator (STG1) in the data processing code. For example, the generated data processing code may include as follows:

SRC1→TX1→TX2→STG1
STG1→TX3
STG1→TX4
STG1→TX5

Where STG1 appears as a target to the upstream operator and a source for the downstream operator. Thus, the staging operator avoids executing the repetitive upstream data processing flow and reduces the cost of executing the data processing job. In this example, the multiple (e.g., three) data reads from the data source may match a predetermined signature and trigger the addition of the staging operator. For example, the optimization process of the two-stage compilation may include a rule defining a predetermined signature of repeated data reads with different transformations and, in response to identifying such a predetermined signature (e.g., a particular characteristic of the data flow) in the provided data flow, the optimization process adds an operator also according to the rule. As noted above, in some embodiments, the predetermined signature may also be to identify where to add an operator. For example, as part of a predetermined signature defining multiple data reads, the operator (i.e., a staging operator) may be added after or as part of the first data read. Also, in some embodiments, the predetermined signature may identify not only particular operations or sequences of operations defined in the data flow but may consider one or more characteristics of the source data, a configuration of the target runtime, or a combination thereof. For example, the predetermined signature may define multiple read operations where the data being read exceeds a particular size, is of a particular size, is obtained from a particular type of data storage location or locations, or a combination thereof. In addition or alternatively, the predetermined signature may define multiple read operations using a particular cluster size, type of server or VM, or a combination thereof. Thus, the predetermined signature may define when and where to add an operator and this definition may depend on the data flow, one or more characteristics of the source data, the configuration of the target runtime environment, or a combination thereof. Considering the target data processing runtime allows the optimization to add operators where the addition impacts processing costs and avoids adding operators where little cost savings are realized.

As another non-limiting example, a data flow may include a large data set written to a relatively smaller number of output partitions (e.g., a smaller number of files), such as, for example:

SRC→TX1→TX2→TGT where TGT represents the target in which output data is stored, and where SRC is a large data source that is processed using a large cluster (e.g., >1000 CPUs) thereby having a large number of partitions (>1000 partitions) and TGT has fewer partitions (e.g., <10) as specified in the data flow. In this situation, when a large cluster that is used by the data processing job is also used for the write, most of the CPUs will remain idle during the write operation, which is not optimal. Accordingly, as part of the first stage of compilation, a staging operator may be introduced before the target as follows:

SRC→TX1→TX2→STG→TGT where STG appears as a target to the upstream operator and a source for the downstream operator. Accordingly, in this example, the data flow would be executed according to:

SRC→TX1→TX2→STG
STG→TGT where the second flow (STG→TGT) could be run with a smaller cluster (e.g., a size equal to the number of output partitions) therefore reducing the cost of executing the job.

Example Architecture

FIG. 1 is a block diagram 100 illustrating an example pattern of an IaaS architecture, according to at least one embodiment. As illustrated in FIG. 1, service operators 102 can be communicatively coupled to a secure host tenancy 104 that can include a virtual cloud network (VCN) 106 and a secure host subnet 108. In some examples, the service operators 102 may use one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
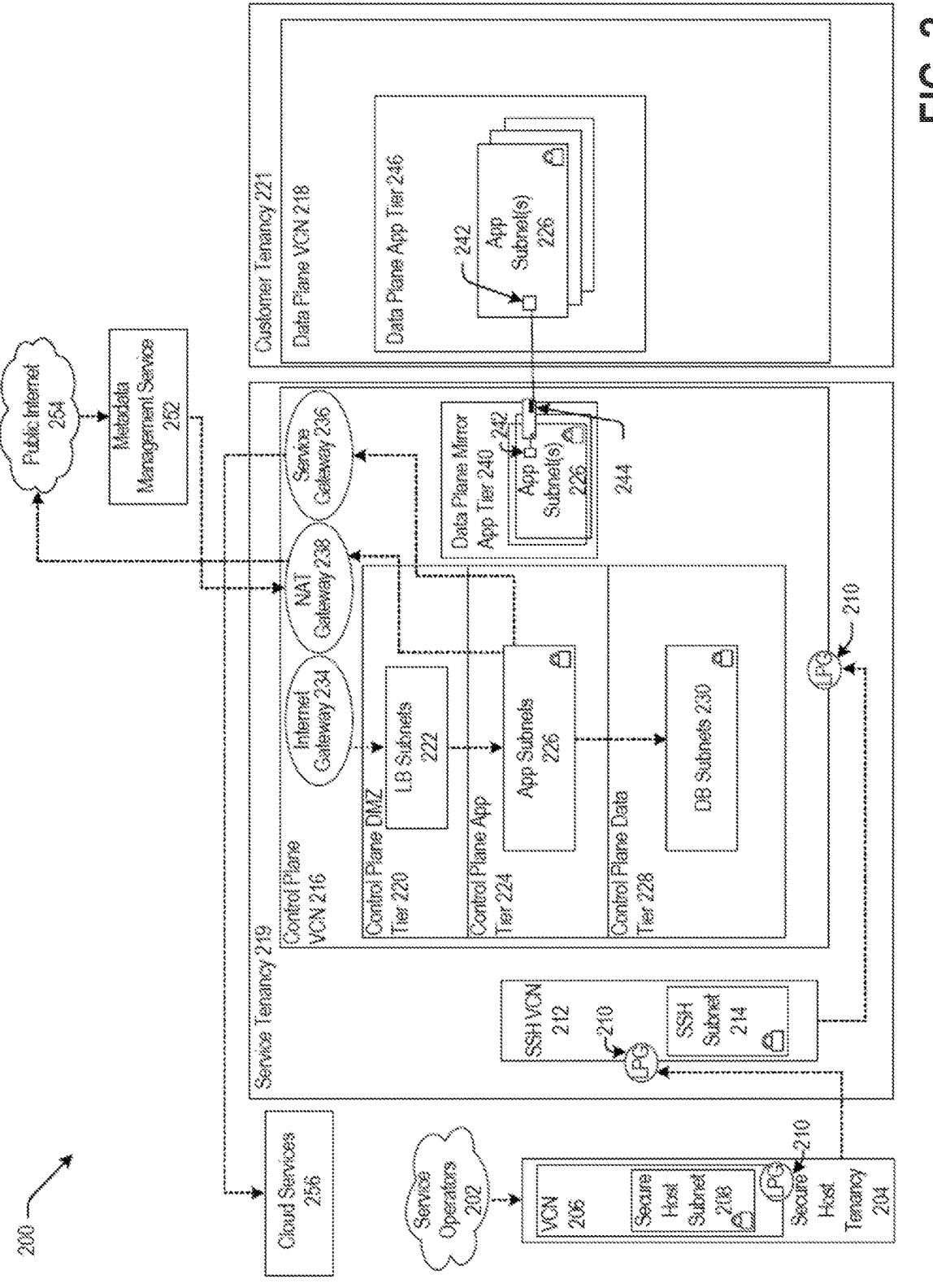
FIG. 2 is a block diagram illustrating another pattern for implementing a cloud infrastructure as a service system, according to at least one embodiment.

FIG. 2 is a block diagram 200 illustrating another example pattern of an IaaS architecture, according to at least one embodiment. As illustrated in FIG. 2, service operators 202 (e.g., service operators 102 of FIG. 1) can be communicatively coupled to a secure host tenancy 204 (e.g., the secure host tenancy 104 of FIG. 1) that can include a VCN 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, provisioned in the control plane VCN 216 contained in the service tenancy 219, to be deployed or otherwise used in the data plane VCN 218 that is contained in the customer tenancy 221.

In other examples, the customer of the IaaS provider may have databases that live in the customer tenancy 221 for which data flows may be provided. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218, which can be employed to generate a data flow. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
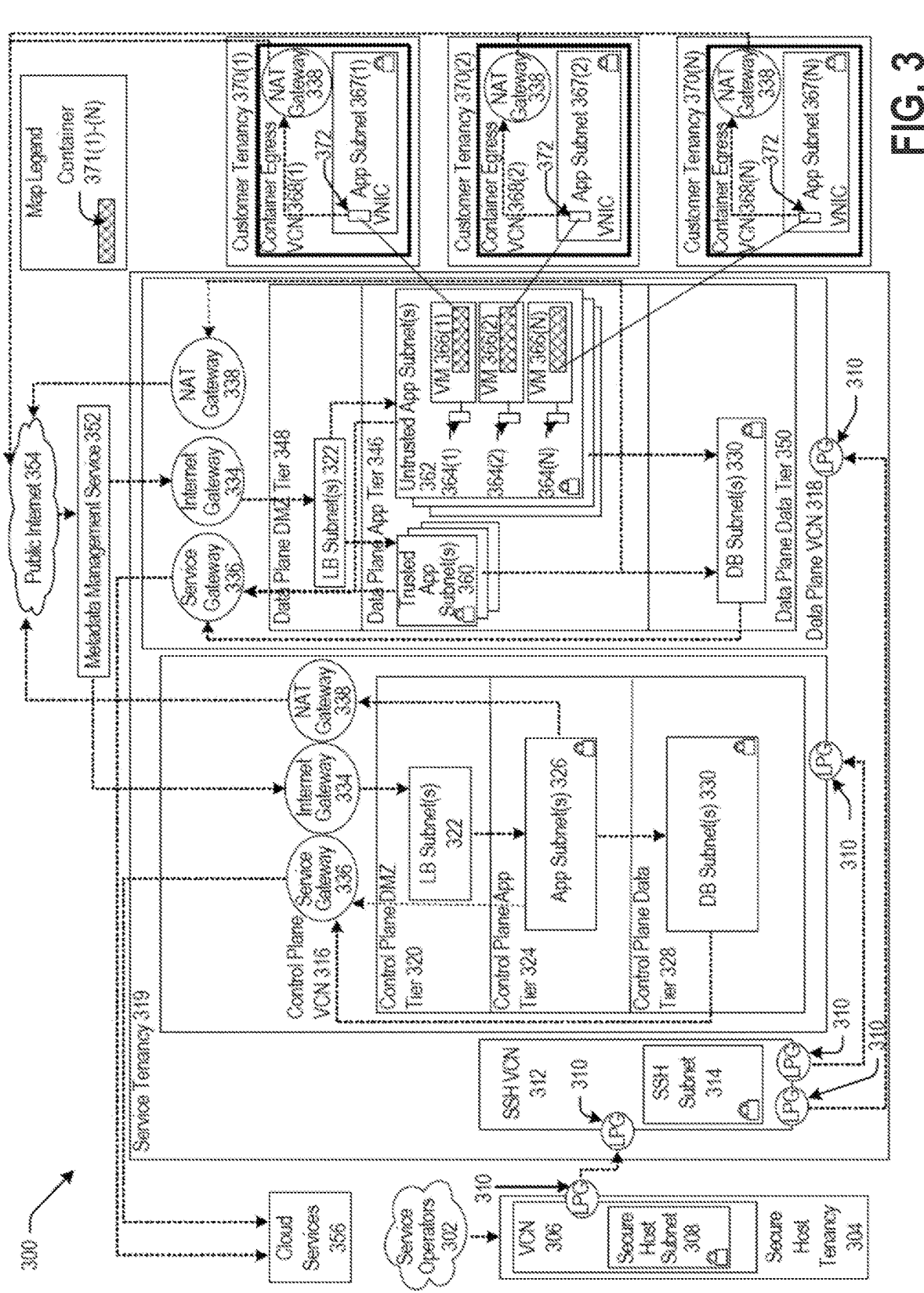
FIG. 3 is a block diagram illustrating another pattern for implementing a cloud infrastructure as a service system, according to at least one embodiment.

FIG. 3 is a block diagram 300 illustrating another example pattern of an IaaS architecture, according to at least one embodiment. As illustrated in FIG. 3, service operators 302 (e.g., service operators 102 of FIG. 1) can be communicatively coupled to a secure host tenancy 304 (e.g., the secure host tenancy 104 of FIG. 1) that can include a VCN 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1). In some cases, the customer tenancies 370(1)-(N) provide a data processing cluster (e.g., Spark Cluster) (not shown).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively coupled to cloud services 356.

In some embodiments, the data plane VCN 318 can be integrated with customer tenancies 370. This integration can be useful or desirable for customers of the IaaS provider in some cases such as a case that may desire support when executing code, such as a data flow or the compiled data processing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N) running code, where the containers 371(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
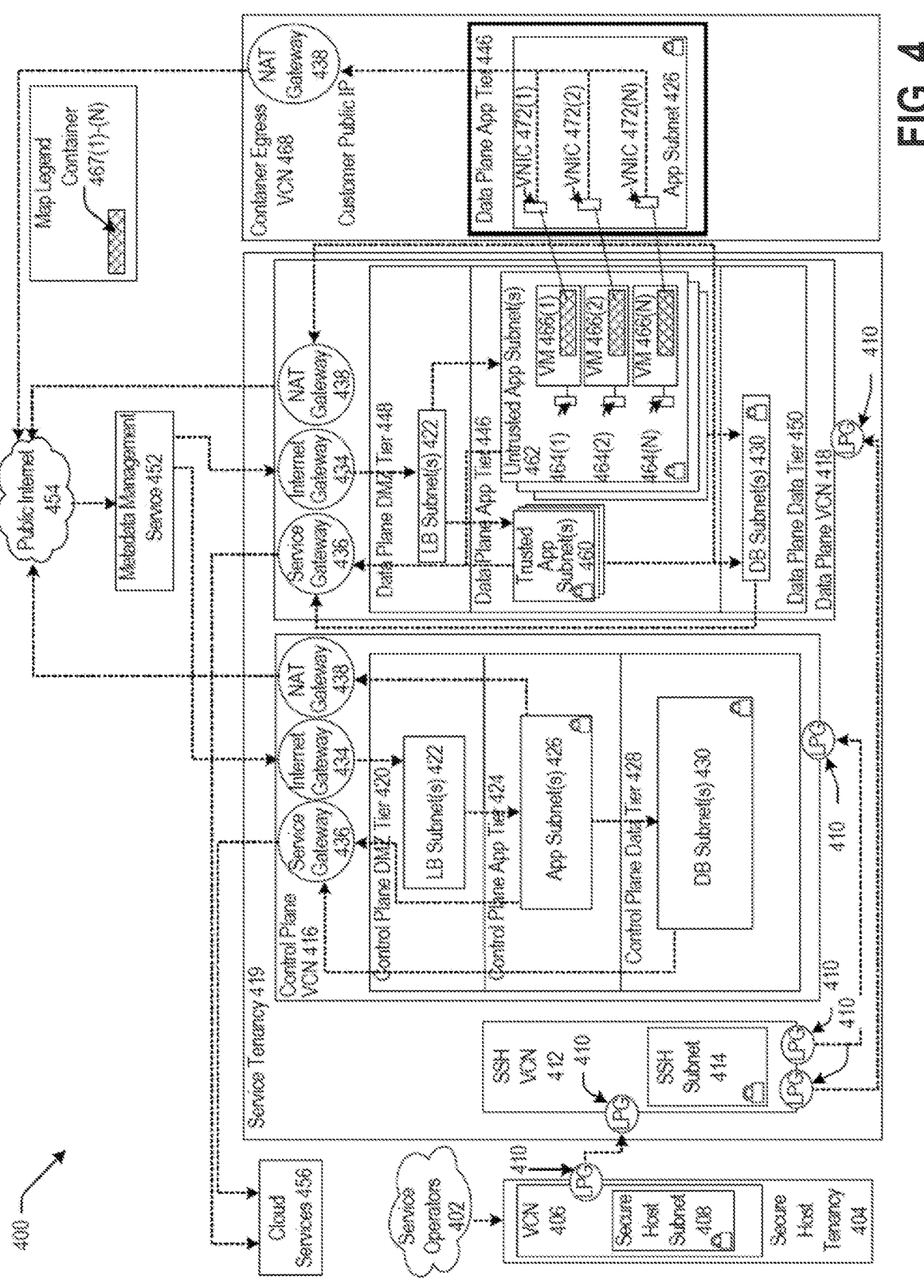
FIG. 4 is a block diagram illustrating another pattern for implementing a cloud infrastructure as a service system, according to at least one embodiment.

FIG. 4 is a block diagram 400 illustrating another example pattern of an IaaS architecture, according to at least one embodiment. As illustrated in FIG. 4, service operators 402 (e.g., service operators 102 of FIG. 1) can be communicatively coupled to a secure host tenancy 404 (e.g., the secure host tenancy 104 of FIG. 1) that can include a VCN 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining if the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the OCI provided by the present assignee which can be employed to provide target data assets. These target data assets represent data sources that can be used to support the data flows provided by a user.

Example Computer System

Figure 5:
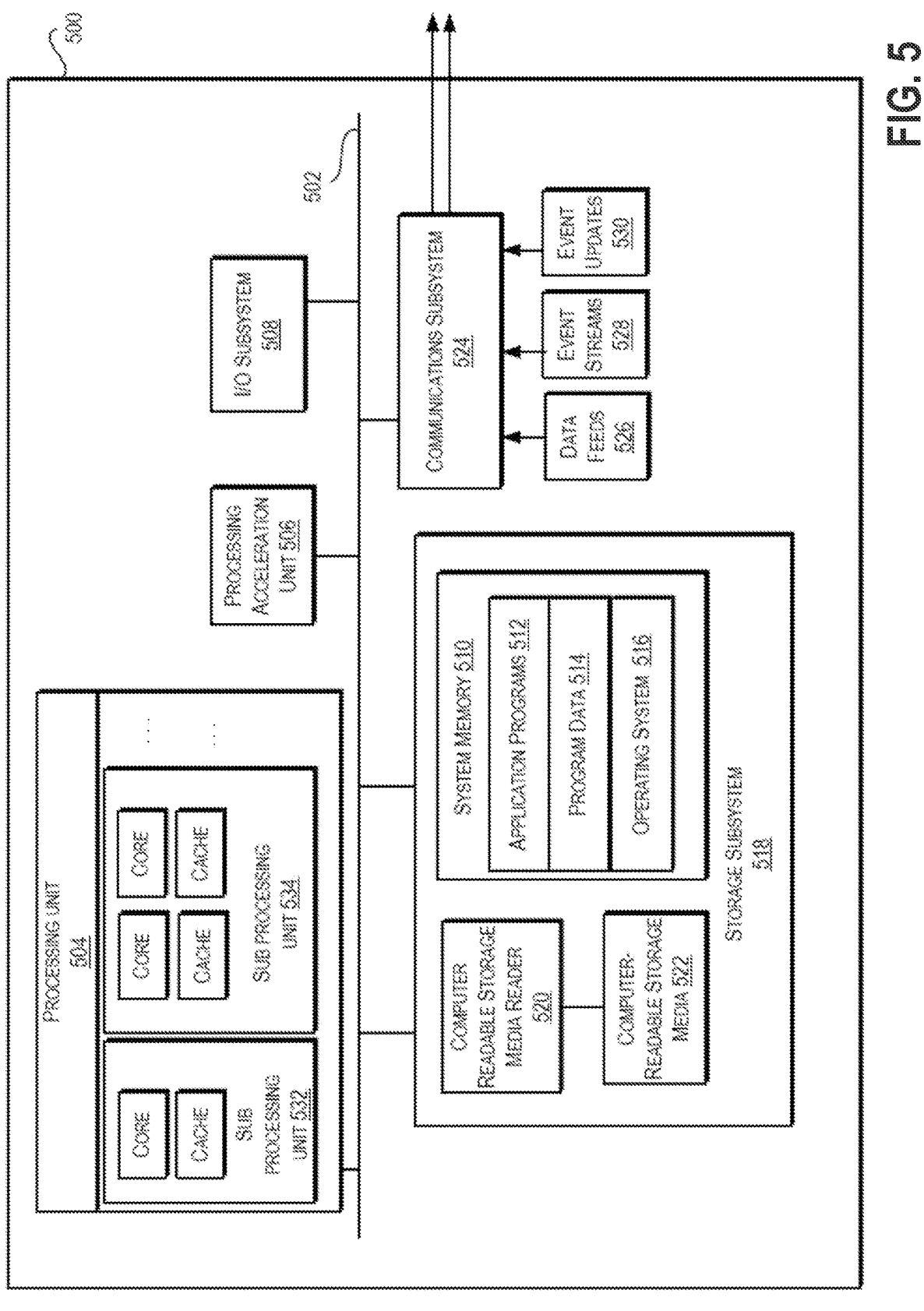
FIG. 5 is a block diagram illustrating an example computer system, according to at least one embodiment.

FIG. 5 illustrates an example computer system 500, in which various embodiments described herein may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, the processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, positron emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions that are loadable and executable by processing unit 504. System memory 510 may also store data that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Example Two-Stage Compilation Architecture

Figure 6:
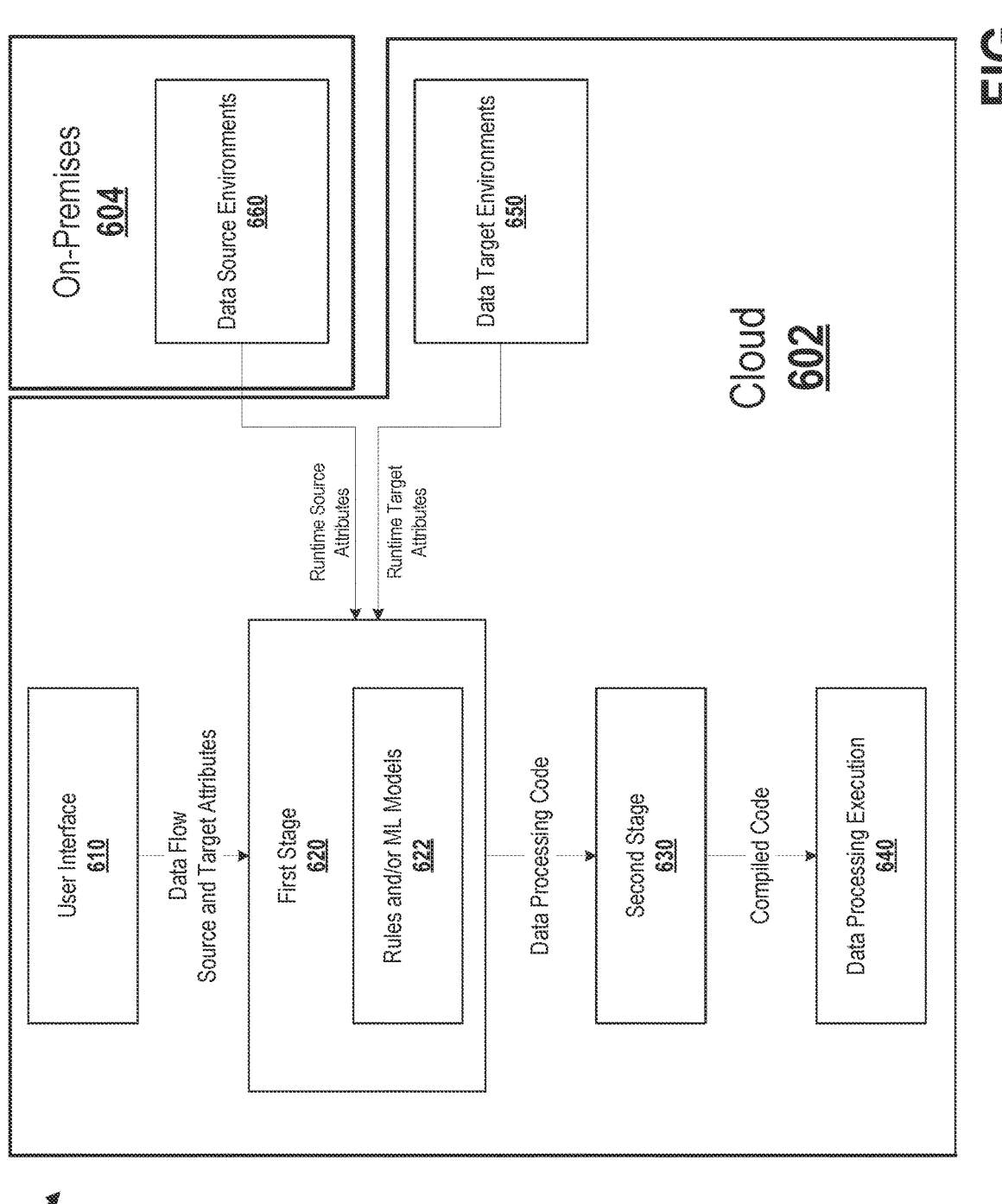
FIG. 6 is a block diagram illustrating an example system architecture for performing multiple-stage compilation, according to at least one embodiment.

FIG. 6 illustrates an example system architecture 600, in which various embodiments described herein may be implemented. The system architecture 600 may be implemented with any of the computer systems described above. As shown in the figure, system architecture 600 includes a cloud 602 and an on-premises environment 604. The cloud 602 includes services provided by a VCN (such as the VCNs 106, 206, 306, and 406 described above with reference to FIGS. 1-5 respectively). As illustrated in FIG. 6, the cloud 602 provides data target environments 650. As illustrated in FIG. 6, the on-premise environment 604, which includes one or more computers (such as the example computer system 500 of FIG. 5) on the premises of an organization, may provide one or more data source environments 660. It should be understood that the system architecture 600 is provided as one example and the methods described herein may be implemented using various system architectures and associated configurations. For example, in some embodiments, the compilation described herein performed via the system architecture 600 may use more than two stages of compilations, wherein one or more additional stages may be implemented prior to a first stage of compilation 620, between the first stage of compilation 620 and a second stage of compilation 630, subsequent to the second stage of compilation 630, or a combination thereof. Also, data processing may occur through or with one or more intermediary devices or modules not illustrated in FIG. 6. It should also be understood that each of stage of compilation described herein may be performed by a single compiler or distributed among multiple compilers.

In some examples, the software services provided via the cloud 602 may provide a user interface 610. In some embodiments, the user interface 610 is generated by a code development application. For example, in some embodiments, a user may draw or otherwise generate a data flow defined as a DAG via the user interface 610. In some embodiments, a user may provide source and target attributes (e.g., characteristics of the source data, a target runtime configuration, or a combination thereof) via the user interface 610 to the first stage of compilation 620 along with the data flow. As described above, in some embodiments, such attributes may be obtained during the first stage of compilation 620 from statistics provided via one or more data sources, clusters in the target runtime, or the like.

At a first stage of compilation 620, in some embodiments, the data flow is processed and converted to data processing code (also referred to as an intermediate format for purposes of a multiple-stage, e.g., two-stage, compilation) for the respective target runtime by adding one or more operators to the data flow while maintaining the semantic equivalence. In some cases, the data processing code is structured in a human-readable format. As described above, in some examples, the data processing code transforms repetitive data or operations represented within the data flow such that operations are executed once, and the output is persisted as staged output instead of using the original source and transformations in the data flow as provided. As noted above, the generated data processing code includes one or more operators selected by the user (e.g., as specified in the data flow, such as, for example, as a DAG, source code, or other type of user input defining the data flow) and additional operators for optimizing the processing of the data flow (also referred to herein as added optimization operators).

In some embodiments, the added optimization operators and respective locations in a provided data flow are determined according to a defined rule set 622 and/or by processing the data flow and the source and target attributes (e.g., the one or more characteristics of the source data, the target runtime configuration, or a combination thereof) via one or more trained machine learning models (the rule set and the machine learning models referred to individually and collectively herein with reference number 622). As described above, the rule set and/or machine learning models 622 may determine one or more optimization operators to add to the data flow and their respective locations in a provided data flow according to a signature representing an opportunity for optimizing the data flow.

In some embodiments, the rule set is defined and/or the models 622 are trained according to runtime source attributes received from the data source environments 660 (e.g., characteristics of source data), runtime target attributes provided by the data target environments 650 (e.g., a target runtime configuration), or a combination thereof. Generally, the data source environments 660 are executed within the on-premises environment 604 and may include systems and/services configured to provide data processed via a data flow. Generally, the data target environments 650 include target platforms where compiled code generated for a data flow is executed. For example, as the first stage of compilation 620 (also referred to herein as an "optimizer" is executed within the cloud 602), the first stage of compilation 620 may have access to attributes that user may not have ready access to, such as, for example, a number of partitions, a size of partitions, etc. Accordingly, in some embodiments, the first stage of compilation 620 may obtain runtime source attributes, runtime target attributes, or a combination thereof automatically (e.g., without user input). However, as illustrated in FIG. 6, in various embodiments, the first stage of compilation 620 may be configured to receive such attributes automatically, from a user, or a via combination thereof. As described above, these attributes (e.g., characteristics of data sources, a target runtime configuration, or a combination thereof) may be used via the rule set and/or models 622 to identify operators to add for optimization purposes. For example, characteristics received from a user may specify that the partitions in the data source environments 660 is high and the target runtime configuration may specify that the partitions in the data target environments 650 is low, wherein the first stage of compilation 620 may have a rule specifying that if there is a partition count mismatch (e.g., by a predetermined amount) between source and destinations, a staging operation should be used as described above. It should be understood that the rule set may be hard-coded or may be trained using machine learning techniques, such as, for example, by monitoring historical data to automatically define rules or models for identify opportunities for data flow optimization. For example, by monitoring a cost of data processing associated with particular data flows, machine learning techniques may identify data processing having a high data processing cost, which may be used to identify similar patterns in a data flow being processed by first stage of compilation 620.

As depicted in FIG. 6, the data processing code generated in the first stage of compilation 620 is provided to the second stage of compilation 630. In some embodiments, the second stage of compilation 630 includes one or more compilers configured to generate, based on the provided data processing code, compiled code for the data flow that is executable within the target runtime. In some embodiments, as previously noted, the data processing code (also referred to as an intermediate format for purposes of the two-stage compilation) is structured in a human-readable format (e.g., as source code) and, in some embodiments, the second stage of compilation 630 (e.g., the compiler) compiles the data processing code into machine readable code (e.g., object code). In some embodiments, the compiler generating the machine executable code is included in the same application as the first stage of the compilation 620. In other embodiments, the compiler is a separate application and receives output generated by the application performing the first stage of the compilation 620 (e.g., from a data store, through an API, or the like). In some embodiments, the compiler may include an Apache Spark compiler or a similar data analytics compiler.

The compiled code is provided by the second stage of compilation 630 to the data processing execution module 640 for execution within the target runtime.

Example Process

FIG. 7 depicts a flowchart showing an example process 700 for converting a data flow into data processing code for a specific runtime environment. The process 700 may be implemented within, for example, the example system architecture 600 described with reference to FIG. 6, to perform the two-stage compilation described generally above. For clarity of presentation, the description that follows generally describes the process 700 in the context of FIGS. 1-6. However, it will be understood that the process 700 may be performed by other suitable systems, environments, software, and hardware, or a combination of systems, environments, software, and hardware as appropriate. In some examples, various operations of the process 700 can be run in parallel, in combination, in loops, or in a different order.

At 702, a data flow for processing a set of source data on a target runtime is received. As noted above, in some embodiments, the data flow includes a data processing design (e.g., a visual or graphical representation), data processing code (e.g., human-readable code or source code), or a combination thereof. For example, in some embodiments, the process 700 may be used with a data flow defined as a DAG, which a user may draw or otherwise generate (e.g., drag and drop objects and enter or select parameters) within a graphical user interface (such as the user interface 610 of FIG. 6) generated by a code development application. Accordingly, the data flow may be received from a user interface or a data source (e.g., where the code development application stores data flows). In some embodiments, the process 700 is integrated into such a code development application (e.g., as a plug-in). In other embodiments, the process 700 is a separate application from the code development application but receives the data flow as defined in the code development application. The data flow may be communicated through an application programming interface or other communication interface, may be input or selected by a user of the process 700 and retrieved from a data storage medium by the process 700, or a combination thereof.

As illustrated in FIG. 7, the process 700 also includes determining source data characteristics (at 703) and determining a target runtime configuration (at 704). The target runtime configuration and the source data characteristics may be referred to herein as "source and/or target attributes." As described above with respect to FIG. 6, a user may provide source and/or target attributes, one or more of these attributes may be obtained within the cloud environment (e.g., without user interaction), or a combination thereof. For example, as described above, during the first stage of compilation 620 source and/or target attributes may be received from the user (e.g., through the user interface 610), from the data source environment 660, from the data target environments 650, or a combination thereof. In particular, within the cloud 602, the first stage of compilation 620 may have access to cloud settings or configurations for a runtime environment that a user may not have access to and, thus, may not be able to provide manually.

As noted above, the characteristic(s) associated with the set of source data may include a size of the source data, a type of the source data, one or more locations where the source data is stored, bandwidth limitations for accessing the data, characteristics of the storage mediums storing the data, or a combination thereof. As also noted above, the target configuration of the target runtime may include a number of servers, CPUs, VMs, containers, or a combination thereof, a shape of such servers, CPUs, VMs, containers, etc., a type of server, CPU, VM, or container, or the like.

From 704, the process 700 proceeds to 708 where data processing code is generated, such as, for example, by adding one or more operators to the data flow at a point based at least on the characteristic(s) associated with the set of source data and the target configuration of the target runtime. As described above, the addition of the operator to the data flow may be performed according to a rule-based optimization or a cost-based optimization, wherein these optimizations may define a predetermined sequence that, if identified in the provided data flow and, optionally, depending on the source data characteristics and the target runtime configuration, can represent an opportunity to add an operator and optimize the associated data processing code. Again, as noted above, the generated data processing code includes one or more operators selected by the user (e.g., as specified in the data flow, such as, for example, as a DAG, source code, or other type of user input defining the data flow) and additional operators for optimizing the processing of the data flow.

In some embodiments, the optimization operator added to the data flow includes a staging operator. Per the examples provided above, an added staging operator may persist a content element associated with the data flow, such as to external storage (e.g., a cloud object store or a runtime managed store). As also described with respect to the above examples, an added staging operator may be configured to prevent execution of repetitive data processing in the data flow. The repetitive data processing may perform the same operation and an added staging operator may operate as a target for an upstream operator and as a source for a downstream operator associated with the operation. Similarly, per the above examples, when a data flow includes operations that write a data set to a plurality of output partitions, wherein each of the plurality of output partitions include an output file, an added staging operator may reduce a number of clusters required to write the data set to the output partitions compared to a number of clusters required to process the data set. Accordingly, each added operator reduces a cost associated with executing the data flow in the target runtime. As described above, the generated data processing code, even with the additional optimization operator(s), maintains semantics of a design of the data flow while optimizing the data processing code in terms of processing resources. It should be understood that embodiments described herein are not limited to added staging operators and other types of additions, removals, or edits may be performed as part of converting a data flow into data processing code for a specific runtime environment. For example, instructions reading data may be combined or the order may be changed to optimize the data reads for the runtime environment. Similarly, a read instruction may be modified to limit the amount of data read (e.g., to limit data reads to data needed for subsequent processing), perform intermediary processing of read data (e.g., to limit read data or data needing staging for subsequent use), or the like. Similarly, in some embodiments, an added optimization operator may segment a data flow into multiple sub-data flows for optimization the data processing and ensuring that data processing does not fail due to the cardinalities (size, configuration, or the like) of the target cluster that is processing the data flow.

From 708, the process 700 proceeds to 710 where the data processing code is provided as output to a compiler (such as a compiler included in the second stage of compilation 630 of FIG. 6) for generation of machine executable code (as the second stage of compilation). From 710, the second stage of compilation 630 may be configured to generate compiled code from the data processing code (at 712) and the compiled code (e.g., object code) may be executed within the target runtime environment (at 714) (e.g., via the target environment provided within the cloud 602). Executing the compiled code may include performing various data processing steps as defined by the data flow and may involve the presentation of data to an end user, such as through one or more user interfaces.

Computer Program

In some embodiments, the platforms, systems, media, and methods disclosed herein include at least one computer program, or use of the same. A computer program includes a sequence of instructions, executable in the electronic processor (e.g., the processing unit 504) of the computer, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to determine operators and their placement based on a data flow and target runtime environment. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received digital profile data may be employed to train various algorithms. Moreover, as described above, these algorithms can be continuously trained/retrained using real-time user data as it is received. In some embodiments, the machine learning algorithm employs regression modeling where relationships between variables are determined and weighted. In some embodiments, the machine learning algorithm employs regression modeling where relationships between predictor variables and dependent variables are determined and weighted.

Web Application

In some embodiments, a computer program includes a web application. A web application refers to an application software that runs on a web server, unlike computer-based software programs that are run locally on the operating system of the device. The web application is accessed by a user through a web browser with an active network connection. A part of the web application may run on a remote server and another part may run on a client device usually inside a web browser and both parts may communicate over a computer network, for example the internet. In some embodiments, a web application is created using a software framework such as Microsoft®.NET or Ruby on Rails (RoR). In some embodiments, a web application employs one or more database systems including, by way of non-limiting examples, relational, non-relational, object oriented, associative, and extensible Markup Language (XML) database systems. In further embodiments, suitable relational database systems include, by way of non-limiting examples, Microsoft® SQL Server, mySQL™, and Oracle®. A web application may be written in one or more markup languages, presentation definition languages, client-side scripting languages, server-side coding languages, database query languages, or combinations thereof.

Standalone Application

In some embodiments, a computer program includes a standalone application, which is a program that is run as an independent computer process, not an add-on to an existing process, (e.g., not a plug-in). Standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the systems and methods disclosed herein include software, server, or database modules. Software modules are created using machines, software, and languages. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Other Definitions

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished (e.g., by designing electronic circuits to perform the operation, by programming programmable electronic circuits such as microprocessors to perform the operation, or any combination thereof). Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitations of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

EXAMPLES

The following are enumerated devices, methods, and systems for converting a data flow to data processing code.

Example 1. A system comprising: an electronic processor configured to: receive a data flow for processing a set of source data on a target runtime; determine a characteristic associated with the set of source data; determine a target configuration of the target runtime; generate data processing code at least by adding an operator to the data flow at a point based at least on the characteristic associated with the set of source data and the target configuration of the target runtime; and output the data processing code to a compiler for generation of machine executable code.

Example 2. A computer-implemented method for converting data flow to data processing code, the method being executed by an electronic processor and comprising: receiving a data flow for processing a set of source data on a target data processing runtime; converting the data flow to data processing code by adding one or more operators to the data flow, each of the one or more operators associated with a point in the data flow identified according to the target data processing runtime; and outputting the data processing code to a compiler.

Example 3. The method of example 2, wherein converting the data flow to the data processing code includes applying at least one selected from a group consisting of a rule-based optimization and a cost-based optimization to the data flow.

Example 4. The method of any of examples 2-3, wherein the data flow comprises at least one selected from a group consisting of a data processing design and data processing code.

Example 5. The method of example 4, wherein the data processing design comprises a directed acyclic graph (DAG).

Example 6. The method of any of examples 2-5, wherein at least one of the one or more operators is configured to persist a content element associated with the data flow.

Example 7. The method of example 6, wherein the at least one of the one or more operators is configured to persist the content element to at least one selected from a group consisting of a cloud object store and a runtime managed store.

Example 8. The method of any of examples 2-6, wherein the target data processing runtime includes at least one selected from a group consisting of a characteristic associated with the set of source data and a target runtime configuration.

Example 9. The method of any of examples 2-8, wherein the data flow includes repetitive data processing, and wherein at least one of the one or more operators is configured to prevent execution of the repetitive data processing.

Example 10. The method of example 9, where the repetitive data processing performs the same operation, and wherein the at least one of the one or more operators is configured as a target for an upstream operator and as a source for a downstream operator associated with the operation.

Example 11. The method of any of examples 2-10, wherein the data flow includes writing a data set to a plurality of output partitions.

Example 12. The method of example 11, wherein each of the plurality of output partitions comprises an output file.

Example 13. The method of example 11, where at least one of the one or more operators comprises a staging operator configured to reduce a size or number of clusters required to write the data set to the output partitions compared to a size or number of clusters required to process the data set.

Example 14. The method of any of examples 2-13, wherein converting the data flow to the data processing code maintains semantics of a design of the data flow.

Example 15. The method of any of examples 2-14, wherein the compiler is configured to compile the data processing code into machine readable code for execution in the target runtime.

Example 16. The method of any of examples 2-15, wherein the data flow is received from at least one selected from a group consisting of a user interface and a data source.

Example 17. The method of any of examples 2-16, wherein the data flow is structured in a human readable format.

Example 18. The method of any of examples 2-17, wherein the data processing code is structured in a human readable format.

Example 19. The method of any of examples 2-18, wherein at least one of the one or more operators comprises a staging operator configured to reduce a cost associated with executing the data flow in the target runtime.

Example 20. A non-transitory computer readable medium having stored thereon executable instructions that, when executed by an electronic processor, cause the electronic processor to perform operations comprising: receiving a data flow for processing a set of source data on a target data processing runtime; converting the data flow to data processing code that includes a staging operator associated with a point in the data flow, wherein the staging operator and associated point in the data flow are identified according to the target data processing runtime; and outputting the data processing code to a compiler.

Example 21. A non-transitory computer readable medium having stored thereon executable instructions that, when executed by an electronic processor, cause the electronic processor to perform any of the methods of examples 1-19.

What is claimed is:

1. A method comprising:

identifying a sequence of data processing activities for processing a set of source data in a target processing environment;

determining one or more characteristics associated with the set of source data, the one or more characteristics including a size, a location, a type, a number of rows, and a size of intersection for a unique key;

determining a target configuration of the target processing environment, the target configuration including a number of servers, a number of central processing units, a number of virtual machines, a cluster topology, a type of central processing units, a type of virtual machines, bandwidth limitations, a data storage performance, and combinations thereof;

selecting a point in the sequence of data processing activities based on the one or more characteristics associated with the set of source data and the target configuration of the target processing environment;

generating data processing code that adds an operator to the sequence of data processing activities at the point based on at least on the one or more characteristics associated with the set of source data and the target configuration of the target processing environment that optimizes processing efficiency or cost efficiency of the sequence of data processing activities; and outputting the data processing code to a compiler for generation of machine executable code that adds the operator to the sequence of data processing activities at the point, wherein the method is performed by at least one device including a hardware processor.

2. The method of claim 1, wherein the sequence of data processing activities comprises at least one selected from a group consisting of a data processing design and data processing code.

3. The method of claim 1, wherein the sequence of data processing activities comprises a directed acyclic graph (DAG).

4. The method of claim 1, wherein the operator is configured to persist a content element associated with the set of source data in a cloud object store or a persistent cache.

5. The method of claim 1, wherein the sequence of data processing activities includes a repetitive data processing operation, and wherein selecting the point in the sequence of data processing activities corresponds to a location the repetitive data processing operation.

6. The method of claim 5, wherein the repetitive data processing operation performs a same operation at least twice, and wherein the operator added at the point is configured as a target for an upstream operator and as a source for a downstream operator associated with the operation.

7. The method of claim 1, wherein the sequence of data processing activities includes writing a data set to a plurality of output partitions.

8. The method of claim 7, wherein the operator added to the sequence of data processing activities comprises a staging operator configured to reduce a size of clusters required to write the data set to the plurality of output partitions compared to a size of clusters required to process the data set.

9. The method of claim 1, wherein adding the operator to the sequence of data processing activities maintains semantic equivalence of the sequence of data processing activities.

10. The method of claim 1, wherein at least one of the operator comprises a staging operator configured to reduce a cost associated with executing the sequence of data processing activities in the target processing environment.

11. A system comprising:

a central processing unit (CPU) and computer executable instructions stored in a memory that, when executed by the CPU, are configured to:

identify a sequence of data processing activities for processing a set of source data in a target processing environment;

determine one or more characteristics associated with the set of source data, the one or more characteristics including a size, a location, a type, a number of rows, and a size of intersection for a unique key;

determine a target configuration of the target processing environment, the target configuration including a number of servers, a number of central processing units, a number of virtual machines, a cluster topology, a type of central processing units, a type of virtual machines, bandwidth limitations, a data storage performance, and combinations thereof;

select a point in the sequence of data processing activities based on the one or more characteristics associated with the set of source data and the target configuration of the target processing environment;

generate data processing code that adds an operator to the sequence of data processing activities at the point based on at least on the one or more characteristics a characteristic associated with the set of source data and the target configuration of the target processing environment that optimizes processing efficiency or cost efficiency of the sequence of data processing activities; and output the data processing code to a compiler for generation of machine executable code that adds the operator to the sequence of data processing activities at the point.

12. The system of claim 1, wherein the sequence of data processing activities comprises at least one selected from a group consisting of a data processing design and data processing code.

13. The system of claim 1, wherein the sequence of data processing activities comprises a directed acyclic graph (DAG).

14. The system of claim 1, wherein the operator is configured to persist a content element associated with the set of source data in a cloud object store or a persistent cache.

15. The system of claim 1, wherein the sequence of data processing activities includes a repetitive data processing operation, and wherein selecting the point in the sequence of data processing activities corresponds to a location the repetitive data processing operation.

16. The system of claim 15, where the repetitive data processing operation performs a same operation at least twice, and wherein the operator added at the point is configured as a target for an upstream operator and as a source for a downstream operator associated with the operation.

17. The system of claim 1, wherein the sequence of data processing activities includes writing a data set to a plurality of output partitions.

18. The system of claim 17, wherein the operator added to the sequence of data processing activities comprises a staging operator configured to reduce a size of clusters required to write the data set to the plurality of output partitions compared to a size of clusters required to process the data set.

19. The system of claim 1, wherein adding the operator to the sequence of data processing activities maintains semantic equivalence of the sequence of data processing activities.

20. The system of claim 1, wherein operator comprises a staging operator configured to reduce a cost associated with executing the sequence of data processing activities in the target processing environment.

21. One or more non-transitory computer-readable media storing program instructions that, when executed by one or more hardware processors, cause performance of operations comprising:

identifying a sequence of data processing activities for processing a set of source data in a target processing environment;

determining one or more characteristics associated with the set of source data, the one or more characteristics including a size, a location, a type, a number of rows, and a size of intersection for a unique key;

determining a target configuration of the target processing environment, the target configuration including a number of servers, a number of central processing units, a number of virtual machines, a cluster topology, a type of central processing units, a type of virtual machines, bandwidth limitations, a data storage performance, and combinations thereof;

selecting a point in the sequence of data processing activities based on the one or more characteristics associated with the set of source data and the target configuration of the target processing environment;

generating data processing code that adds an operator to the sequence of data processing activities at the point based on at least on the one or more characteristics associated with the set of source data and the target configuration of the target processing environment that optimizes processing efficiency or cost efficiency of the sequence of data processing activities; and outputting the data processing code to a compiler for generation of machine executable code that adds the operator to the sequence of data processing activities at the point.

22. The one or more non-transitory computer-readable media of claim 21, wherein the sequence of data processing activities comprises at least one selected from a group consisting of a data processing design and data processing code.

23. The one or more non-transitory computer-readable media of claim 21, wherein the sequence of data processing activities comprises a directed acyclic graph (DAG).

24. The one or more non-transitory computer-readable media of claim 21, wherein the operator is configured to persist a content element associated with the set of source data in a cloud object store or a persistent cache.

25. The one or more non-transitory computer-readable media of claim 21, wherein the sequence of data processing activities includes a repetitive data processing operation, and wherein selecting the point in the sequence of data processing activities corresponds to a location the repetitive data processing operation.

26. The one or more non-transitory computer-readable media of claim 25, wherein the repetitive data processing operation performs a same operation at least twice, and wherein the operator added at the point is configured as a target for an upstream operator and as a source for a downstream operator associated with the operation.

27. The one or more non-transitory computer-readable media of claim 21, wherein the sequence of data processing activities includes writing a data set to a plurality of output partitions.

28. The one or more non-transitory computer-readable media of claim 27, wherein the operator added to the sequence of data processing activities comprises a staging operator configured to reduce a size of clusters required to write the data set to the plurality of output partitions compared to a size of clusters required to process the data set.

29. The one or more non-transitory computer-readable media of claim 21, wherein adding the operator to the sequence of data processing activities maintains semantic equivalence of the sequence of data processing activities.

30. The one or more non-transitory computer-readable media of claim 21, wherein at least one of the operator comprises a staging operator configured to reduce a cost associated with executing the sequence of data processing activities in the target processing environment.

* * * * *